United States Patent

[11] 3,617,010

[72] Inventor Don R. Coy
Palatine, Ill.

[21] Appl. No. 3,070
[22] Filed Jan. 15, 1970
[45] Patented Nov. 2, 1971
[73] Assignee Ampex Corporation
Redwood City, Calif.

[54] SPOOL FOR ENDLESS TAPE CARTRIDGE
5 Claims, 7 Drawing Figs.

[52] U.S. Cl. .......... 242/55.19 A, 242/71.8
[51] Int. Cl. .......... B65h 17/48, B65h 75/18
[50] Field of Search .......... 242/55.19 A, 71.8, 71.8 A, 55.19, 55.21; 118/2 RM, DIG. 44, 118

[56] References Cited

UNITED STATES PATENTS

| | | | |
|---|---|---|---|
| 3,088,687 | 5/1963 | Martin | 242/55.19 A |
| 3,443,768 | 5/1969 | Liddle et al. | 242/55.19 A |
| 3,025,012 | 3/1962 | Fries | 242/55.19 A |
| 3,468,490 | 9/1969 | Knox | 242/55.19 A |
| 2,529,420 | 11/1950 | Ramquist | 242/71.8 |

*Primary Examiner*—Billy S. Taylor
*Attorney*—Fitch, Even, Tabin and Luedeka

ABSTRACT: A molded plastic spool having a tape platform for an endless array of magnetic tape and a hub with an upper hub extension thereon is formed in one piece to replace presently used two-piece spools. The hub extension, which has a larger diameter than the diameter of the lower portion of the hub joined to the platform, is formed to allow inward deflection to permit stripping of the spool from a mold. Preferably, the hub extension is segmented to provide individual segments which are deflected radially inwardly during stripping and then allowed to return outwardly when free of the mold.

INVENTOR
DON R. COY

Anderson, Luedeka, Fitch, Even & Tabin
ATTYS.

INVENTOR
DON R. COY

Anderson, Luedeka, Fitch, Even & Tabin
ATTYS.

SPOOL FOR ENDLESS TAPE CARTRIDGE

This invention relates to reels or spools used in magnetic tape cartridges for supporting an endless magnetic tape which is coiled on a spool platform and payed out from an inner winding of the coil adjacent a hub for the spool and, after a playback or recording operation, is returned and rewound as an outer winding on the coil.

The present invention is an improvement over spools such as, for example, the spool disclosed in U.S. Pat. No. 3,350,028 in which the spool is made from two separately molded sections, viz an inner hub section and an outer core section, the latter having a coil-supporting platform. The core and hub sections are assembled and locked together by a snap fit pin and slot arrangement between the respective sections. Tape spools of this kind are produced in the millions of units and hence, a reduction in assembly operations, labor or number of constituent parts becomes very significant. Also, such two-piece spools are subject, on the one hand, to separation if the interlocking grip is too loose; and, on the other hand, to distortion if the interlocking grip is too tight between the pins and slots. Either a too loose or too tight a fit may result in a rejection or failure of the spool at the time of winding the tape thereon or subsequently when within the cartridge.

In addition to the above, such spools must possess good operating performance characteristics such as ease of turning and a smooth and uniform unwinding and winding of tape without undue wear of the tape and without an entangling of the tape turns. In the course of play, the outer windings of the magnetic tape must move inwardly across a tape-supporting platform toward the hub to accommodate subsequently formed outer windings. The innermost winding is guided upwardly by a hub on the spool to leave the coil for travel toward a position to engage a transducer head. Such inwardly sliding movement across the platform is, of course, accompanied by friction and the possibility of tape windings becoming engaged with one another or the inner hub of the spool and not releasing easily therefrom for payout particularly where most of the turning torque for rotating the reel is applied at hub to overcome the inertia of the tape coil and the spool platform.

Accordingly, an object of the invention is to provide an improved, as contrasted with the prior art, commercially acceptable tape spool for tape cartridges of the foregoing kind.

Other objects and advantages of the invention will become apparent from the detailed description taken in connection with the accompanying drawings in which.

Figure 3:
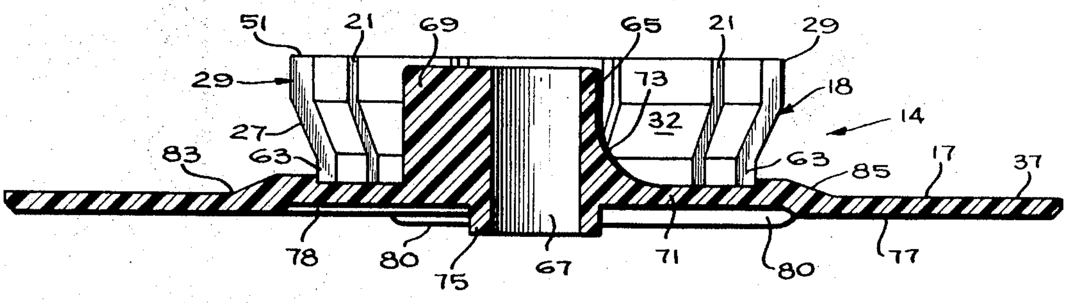
FIG. 3 is a cross-sectional view taken along the line 3—3 of FIG. 2.

As shown in the drawing for purposes of illustration, the invention is embodied in a magnetic tape cartridge 11 of a known construction in which a magnetic tape 12 is provided in an endless array with most of the tape being wound in a roll or coil 13 carried on a rotatable spool or reel 14 for rotation about a central vertical axis through a stationary post 15 fixed to the cartridge. The tape is carried on a platform 17 of the spool and payed out from the center of the coil at a hub 18 and to travel forwardly to and about a guide roller 20 and to travel past a sound transducer head 19 and through the nip of a tape-driving capstan 23 and the pressure roller 25 for returning as an outermost winding on the coil. As the tape is pulled from the hub of the spool, the tape slides upwardly along an inclined surface 27, as best seen in FIG. 3, and across an upper hub extension 29 which has a larger diameter than that of the inclined surface 27 which is joined to the platform 17.

In accordance with the invention, the spool 14 may be molded of plastic and in one piece with the hub 18 integrally joined to the platform 17 as the hub extension 29 is formed in a manner to enable the same to be flexed or collapsed inwardly during stripping of the spool 14 from the mold of a conventional plastic-molding machine. To achieve a temporary collapsing of the larger diameter hub extension to the dimension of the minimum diameter lower portion of the hub, the hub extension is preferably segmented by a plurality slots 21 which divide the cylindrical hub extension into segments 32 each of which may be flexed inwardly toward the spool axis about the lower ends of the segments as the spool is being stripped from a mold. The forming of the spool in one piece advantageously eliminates the necessity for interlocking multiple pieces or sections as with the prior art, commercially acceptable plastic spools of this kind; and therefore, eliminates as a source of difficulty a too loose fit between interlocking spool sections or a too tight interfit between spool sections.

To assist in turning the spool and overcoming the inertial mass of the tape coil 13 and platform 17, the tape platform 17 may be provided with a spirally or convolutely shaped track means 33 in the form of a fine groove 35 which guides the tape convolutions in a spiral path from the outer periphery of the platform towards the hub with the result that each of the tape convolutions is exerting a turning moment on the spool platform at its associated portion of the groove. The preferred spiral groove 35 is formed in an upper surface 37 in the platform and the lower edges of the individual tape convolutions are inserted therein and constrained and guided thereby in a substantially uniform, smooth, controlled path from the outer periphery of the platform 17 to a position adjacent the hub.

Figure 1:
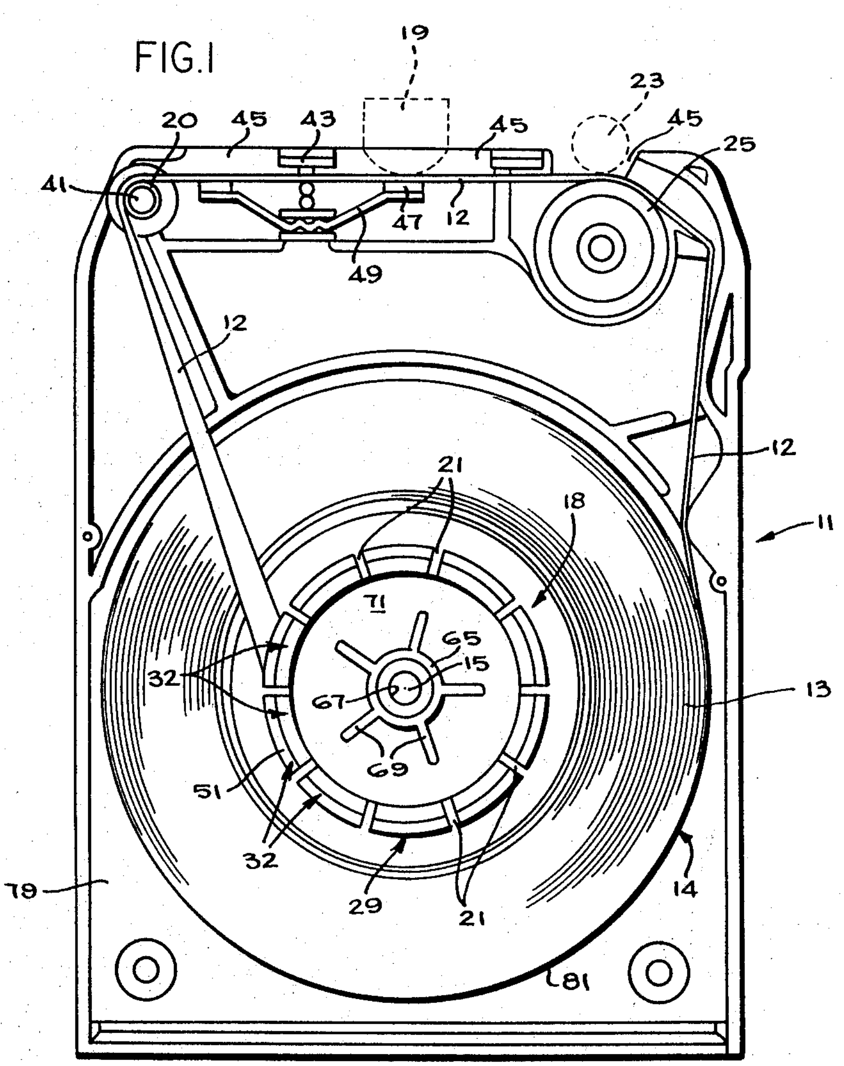
FIG. 1 is a plan view of a cartridge containing a spool embodying the novel features of the invention.
Figure 2:
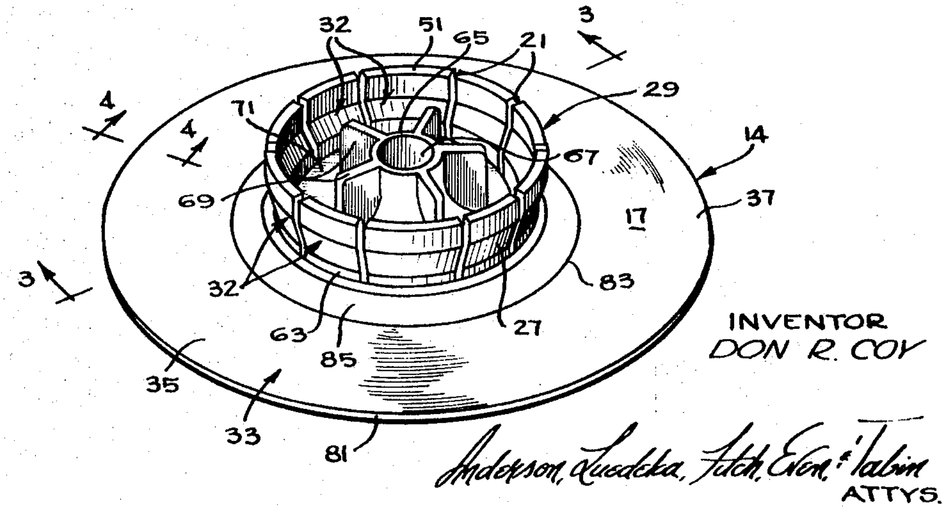
FIG. 2 is a perspective view of the spool shown in FIG. 1.

Referring now in greater detail to the illustrated cartridge 11, it is of a kind produced and sold in very large quantities for insertion into a slot of a playback apparatus (not shown), such as disclosed in U.S. Pat. No. 3,478,973, which has both the transducer head 19 and the tape-driving capstan 23. The cartridge is usually spring urged to hold the tape against the transducer head while the tape is being pulled forwardly, which is left to right as viewed in FIG. 1, by the tape capstan 23 and cooperating pressure roller 25 about the guide roller 20 which is mounted on a post 41 on the cartridge. The tape extends across front wall 43 of the cartridge between the guide roller 20 and pressure roller 25 and closely adjacent to the openings 45 in the front cartridge wall which admit the transducer head 19 and capstan 23. A pressure pad 47 carried on a spring 49 fixed to the cartridge bears against the reverse, lubricated side of the magnetic tape to hold the same in intimate contact with the sound transducer head 19.

Referring now in greater detail to the one-piece, molded plastic spool 14 and in particular to the hub 18 thereof, the slots 31 which divide the hub into segments 32 extend vertically from an upper end wall 51 of the hub extension 29 to the plane of the platform 17. Thus, the segments 32 are separated from one another throughout their vertical extent but are integrally attached to the platform 17 and to each other at their lower ends with the result that the segments 32 may bend inwardly about these lower integral connections. The cumulative total of the slot widths, i.e., the total of individual slot gaps between vertical side walls 59 and 61 thereof, is equal to or greater than the difference between the minimum diameter and maximum outer diameter for the hub so that the hub segments may be flexed inwardly sufficiently to move past the part of the mold forming the minimum outer diameter of the hub. Preferably, this inward flexing is accomplished without the sidewalls 59 and 61 of the slots abutting. By way of example, in the illustrated embodiment of the invention, the hub extension 29 is provided with a maximum outer diameter of about 1.730 inches for its peripheral surface while the minimum outer diameter for a segmented ring wall 63 beneath the inclined surface 27 hub is about 1.470 inches resulting in a difference of 0.160 inch. Each of the slots is about 0.052 inch in width between sidewalls 59 and 61 and ten slots are provided spaced equiangularly about the hub extension to provide a cumulative total space of 0.520 inch which is considerably in excess of 0.160-inch diameter difference.

In the typical molding operation, the spool 14 may be stripped from its mold by suitable ejector pins engaging the side of the spool from which the hub 18 projects and forcing the spool 14 in the opposite direction which would be downwardly as viewed in FIG. 3. During this stripping movement those surfaces of the mold which form the ring wall 63 will abut and cam against the inclined surface 27 thereby flexing the segments 32 inwardly until the segments are sufficiently inward to slide past these mold parts. After the spool is removed, the hub segments will expand outwardly and return to the illustrated position. A suitable plastic such as polyethylene, Delrin, nylon or other plastic material may be used so long as care is taken not to exceed the elastic limit for the hub extension during the flexing of the hub segments. Thus, a spool having a larger outer diameter for its hub extension than for its lower portion may be formed integral with the platform whereas in the prior art a two-piece construction is used.

The spool 14 is mounted for rotation on the cylindrical post 15 of the cartridge by a central sleeve 65 having a hollow cylindrical bore the axis of which is at the central axis for the spool. An inner wall 67 on the sleeve is telescoped over the cylindrical post 15 and mounts the spool for rotation about the post. The sleeve 65 is relatively thin in cross section and is preferably reinforced by a series of vertically extending reinforcing ribs 69 which are integral with the outer peripheral surface of the sleeve 65 and project radially outward therefrom and extend downwardly to a lower hub wall 71 which is integral with the platform 17 as best seen in FIG. 3. In this instance, five reinforcing ribs 69 extend from a plane which is slightly below that of the top wall 51 of the hub extensions 32 downwardly to the wall 71. To provide increased strength for the hub and sleeve 65, the sleeve is joined to the bottom wall by a thick cross-sectional portion and a large radius fillet 73 between the sleeve 65 and the bottom wall 71. On the underside of the spool 14, as best seen in FIG. 3, the sleeve 65 projects downwardly to a circular end wall 75 which is to engage the cartridge and space a bottom surface 77 of the platform 17 by about 0.060 inch in this illustrated embodiment of the invention. The bottom wall 75 rests on the cartridge and thus spaces the platform 17 above the cartridge wall 79. A recessed area 78 is formed on the underside of the spool and about the sleeve and three radially extending ribs 80 are formed within the recessed area 78 to strengthen this area.

Figure 4:
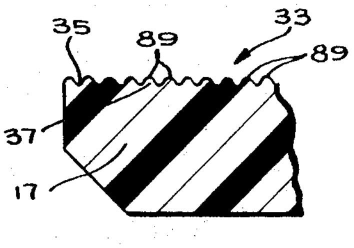
FIG. 4 is an enlarged, fragmentary cross-sectional view of a tape-receiving groove in a spool flange.

Referring now in greater detail to the preferred guiding track means 33, the preferred groove is in the form of a continuous clockwise spiral starting adjacent an outer peripheral edge 81 of the platform 17 and extending inwardly to terminate at an intersection 83 with a radially inwardly and upwardly inclined guide wall 85. For the illustrated spool, the spiral groove begins at a 3.754-inch diameter and terminates at a 2.125-inch diameter. The preferred spiral groove is quite fine, for example, about 0.002 inch in depth and preferably has an arcuate bottom wall curved at about a 0.004-inch radius. The grooves are separated by ridges 89 which are arcuate in cross section, as best seen in FIG. 4, with a radius of 0.02 inch to eliminate sharp corners which might wear the lower edges of the tape bearing thereagainst. While the spiral groove is quite shallow, it is of such length that the tape will exert a turning torque on the platform 17 to rotate the spool at locations spaced radially outwardly of the hub 18. Thus, the spiral groove provides a way of exerting additional torque to overcome the mass of the tape coil and the platform.

Figure 5:
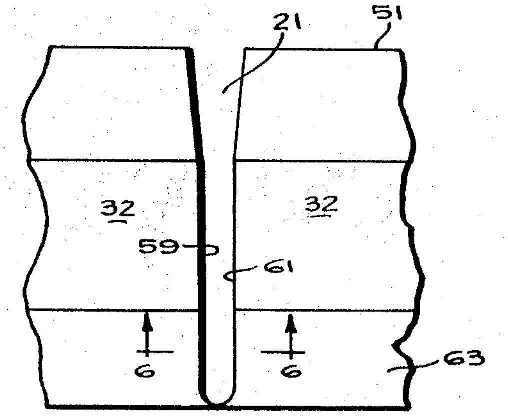
FIG. 5 is an enlarged cross-sectional view of a slot in the hub of the spool of FIG. 2.
Figure 7:
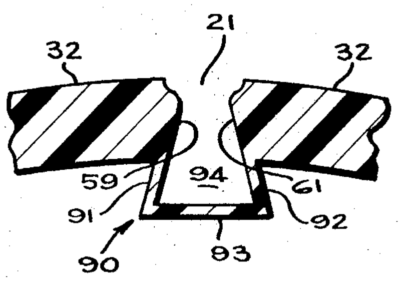
FIG. 7 is a cross-sectional view similar to FIG. 6 for another embodiment of the invention.
Figure 6:
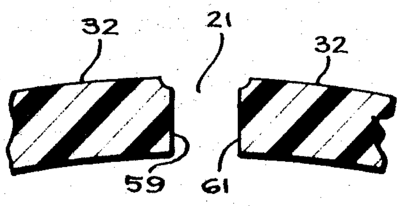
FIG. 6 is a cross-sectional view taken along the line 6—6 of FIG. 5.

The hub 18 may be formed in other manners than with slots 21 therethrough as in the hereinbefore described embodiment of the invention. For example, as will be described in connection with FIG. 7, which is a cross-sectional view taken along the hub at the position at which FIG. 6 is sectioned, the hub 18 may have integral web portions 90 at each slot 21 which allow the hub to collapse and yet interconnect the hub segments 32 to provide a continuous wall for the hub. More specifically, the web portions 90 may have a pair of converging side webs 91 and 92 which are thinner in cross-sectional thickness than the thickness of the hub wall and which are joined at a rear web 93. The rear webs 93 are disposed within the space between the hub segments 32 and the sleeve 65 and each of the rear webs 93 has an arcuate width greater than the width of its adjacent, associated slot 21. The web portions 90 each define a dovetailed-shaped opening 94 which is wider in arcuate extent at the top of the hub than at the bottom of the hub to provide draft for removal of a mold part from the opening 94. That is, the web 91, 92 and 93 are inclined in a vertical direction in a manner similar to the inclination of the slot defining sidewalls 59 and 61 for the slots 21 as is illustrated in FIG. 5. It will be appreciated that, when collapsing the hub 18, the sidewalls 59 and 61 will move toward each other to narrow the gaps 21, as the segments 32 are forced radially inwardly, and similarly, the side webs 91 and 92 will move closer and narrower the arcuate widths of the openings 94.

It will be seen from the foregoing that a one-piece, molded plastic spool for an endless array of tape having an upper hub portion larger in diameter than a lower portion may be made to replace two-piece spools of the prior art. Preferably, the hub is segmented to form flexible portions which will deflect radially inwardly during stripping of the spool from the mold and then return to a nondeflected position. Thus, the spool may be made without a subsequent assembly of sections and without rejections because of an improper fit between the sections.

While a preferred embodiment has been shown and described, it will be understood that there is no intent to limit the invention by such disclosure but, rather, it is intended to cover all modifications and alternate constructions falling within the spirit and scope of the invention as defined in the appended claims.

I claim:

1. A one-piece, plastic spool for supporting a coil of endless magnetic tape for use in a magnetic tape cartridge comprising a tape-supporting platform of substantially disc shape for supporting the lower edges of tape convolutions formed into a coil, a hub projecting upwardly from and centrally of said platform to guide interior convolutions upwardly to pay out from the spool as the latter rotates about an axis through said hub, means within said hub for mounting the same for rotation in said cartridge, a lower portion of said hub integrally formed with said platform and having a tape-engaging surface of a predetermined minimum outer diameter, a hub extension integral with and projecting upwardly from said lower portion and having an outer diameter larger than said minimum diameter, and a plurality hub segments on said hub extension for flexing inwardly toward said axis.

2. A spool in accordance with claim 1 in which an inclined tape-guiding surface is disposed beneath said hub extension and in which said hub extension is segmented by a plurality of vertically extending slots extending through said inclined surface.

3. A spool in accordance with claim 1 in which said platform includes an upper flat planar surface and in which a convolutely shaped track is provided on said upper flat planar surface for guiding said tape convolutions.

4. A one-piece, molded spool for supporting a coil of endless magnetic tape for use in a magnetic tape cartridge comprising, a hub for mounting said spool for rotation about an axis through said hub, a tape-supporting platform projecting outwardly from said hub for supporting said coil of tape for turning about said axis, means on said platform defining a convolutely shaped, tape-guiding track for guiding convolutions of the tape inwardly toward said hub and for receiving a turning moment of force from said movement of said tape along a convolute path, an inclined tape-guiding surface on said hub for guiding said tape while moving upwardly along and from said hub, and a slotted hub extension projecting above said inclined tape-guiding surface and defined by yieldable segments for flexing inward toward the axis to reduce the diameter thereof.

5. A one-piece, plastic spool for supporting a coil of endless magnetic tape for use in a magnetic tape cartridge comprising a tape-supporting platform of substantially disc shape for supporting the lower edges of tape convolutions formed into a coil, a hub projecting upwardly from and centrally of said platform to guide interior convolutions upwardly to pay out from the spool as the latter rotates about an axis through said hub, means within said hub for mounting the same for rotation in said cartridge, a lower portion of said hub integrally formed with said platform and having a tape-engaging surface of a predetermined minimum outer diameter, an upper free end portion of said hub having an outer nondeflected diameter greater than said minimum diameter, and means providing said upper free end portion with sufficient flexibility to allow said upper free end portion to deflect inwardly to reduce the outer diameter thereof to a dimension substantially equal to or less than said minimum diameter.